(12) United States Patent
Wu

(10) Patent No.: US 10,203,860 B2
(45) Date of Patent: Feb. 12, 2019

(54) GRAPHICAL USER INTERFACE ELEMENT ADJUSTMENT

(71) Applicant: eBay Inc., San Jose, CA (US)

(72) Inventor: Junlong Wu, Shanghai (CN)

(73) Assignee: eBay Inc., San Jose, CA (US)

( * ) Notice: Subject to any disclaimer, the term of this patent is extended or adjusted under 35 U.S.C. 154(b) by 292 days.

(21) Appl. No.: 15/074,704

(22) Filed: Mar. 18, 2016

(65) Prior Publication Data

US 2017/0269825 A1 Sep. 21, 2017

(51) Int. Cl.
*G06F 3/0484* (2013.01)

(52) U.S. Cl.
CPC ................ *G06F 3/04847* (2013.01)

(58) Field of Classification Search
CPC ................ G06F 3/0484; G06F 3/0487
See application file for complete search history.

(56) References Cited

U.S. PATENT DOCUMENTS

| | | |
|---|---|---|
| 5,371,846 A | 12/1994 | Bates |
| 5,828,370 A | 10/1998 | Moeller et al. |
| 5,872,566 A | 2/1999 | Bates et al. |
| 5,903,264 A | 5/1999 | Moeller et al. |
| 6,157,381 A | 12/2000 | Bates et al. |
| 6,191,785 B1 | 2/2001 | Bertram et al. |
| 6,670,972 B2 | 12/2003 | Grieve et al. |
| 6,922,816 B1 | 7/2005 | Amin et al. |
| 7,117,450 B1 * | 10/2006 | Chaudhri ............ G06F 3/04847 715/787 |
| 7,222,308 B2 | 5/2007 | Sauermann et al. |
| 7,562,310 B2 * | 7/2009 | Champion .......... G06F 3/04847 715/832 |
| 7,941,819 B2 | 5/2011 | Stark et al. |
| 8,341,542 B2 | 12/2012 | Brody et al. |
| 8,537,127 B2 * | 9/2013 | Homma .............. G06F 3/04847 345/173 |
| 8,677,257 B2 | 3/2014 | Doepke et al. |

(Continued)

FOREIGN PATENT DOCUMENTS

CN 108780380 A 11/2018

OTHER PUBLICATIONS

International Search Report, as issued in connection with International Patent Application No. PCT/US2017/022589, dated Jun. 6, 2017, 3 pgs.

(Continued)

*Primary Examiner* — Alvin H Tan
(74) *Attorney, Agent, or Firm* — Wolfe-SBMC

(57) ABSTRACT

A computer-implemented method of graphical user interface element adjustment may include presenting a graphical user interface element that includes an adjustable element that is configured to be moved to adjust a selection of a value between a first end value and a second end value. In response to a movement of the adjustable element to adjust the selection of the value, the computer-implemented method further include obtaining a time for the movement of the adjustable element and selecting the first end value to adjust based on the time. The computer-implemented method may further include determining an updated end value based on the first end value and the time and presenting the updated end value in the graphical user interface element in place of the first end value.

20 Claims, 7 Drawing Sheets

(56) References Cited

U.S. PATENT DOCUMENTS

| | | | |
|---|---|---|---|
| 8,854,549 B2 | 10/2014 | Price et al. | |
| 8,954,889 B2 * | 2/2015 | Fujibayashi | G06F 3/0488 |
| | | | 715/798 |
| 9,009,626 B2 | 4/2015 | Tsuk et al. | |
| 9,343,110 B2 * | 5/2016 | Raymond | G11B 27/10 |
| 9,495,080 B2 * | 11/2016 | Mockli | G06F 3/0485 |
| 2005/0138565 A1 * | 6/2005 | Jaeger | G06F 3/04847 |
| | | | 715/747 |
| 2009/0070711 A1 * | 3/2009 | Kwak | G06F 3/0485 |
| | | | 715/829 |
| 2009/0293019 A1 | 11/2009 | Raffel et al. | |
| 2010/0005420 A1 | 1/2010 | Schneider | |
| 2011/0107259 A1 | 5/2011 | Haugh et al. | |
| 2013/0326401 A1 | 12/2013 | van Os | |
| 2013/0346897 A1 | 12/2013 | Warner et al. | |
| 2015/0020021 A1 * | 1/2015 | Marr | G06F 3/0485 |
| | | | 715/784 |
| 2015/0070360 A1 * | 3/2015 | Liu | G06F 3/0416 |
| | | | 345/443 |

OTHER PUBLICATIONS

International Written Opinion, as issued in connection with International Patent Application No. PCT/US2017/022589, dated Jun. 6, 2017, 6 pgs.

International Preliminary Report on Patentability received for PCT Patent Application No. PCT/US2017/022589, dated Sep. 27, 2018, 6 pages.

\* cited by examiner

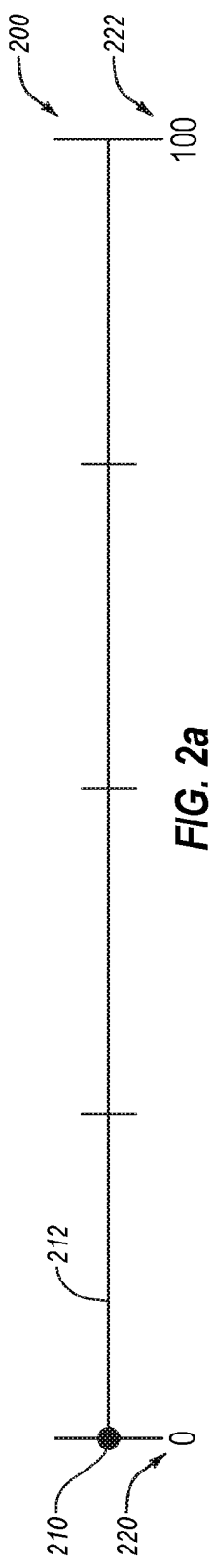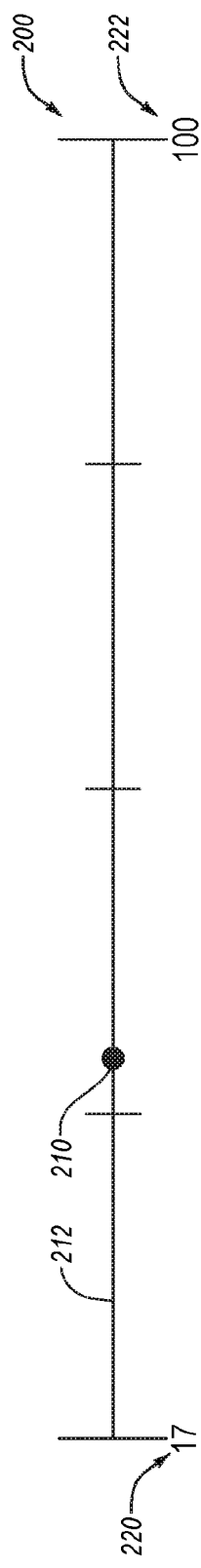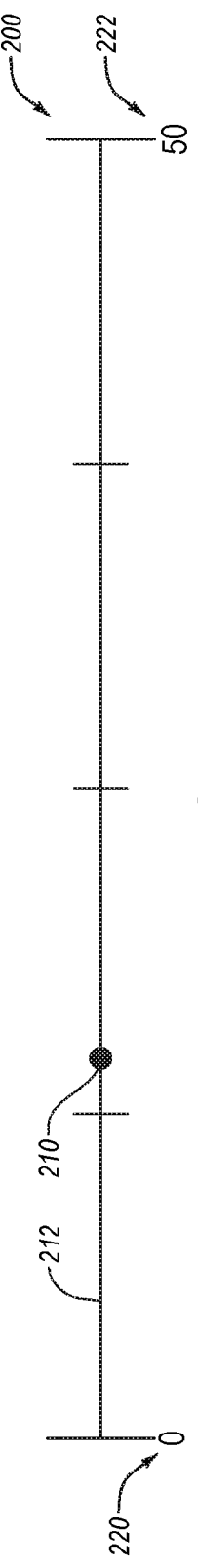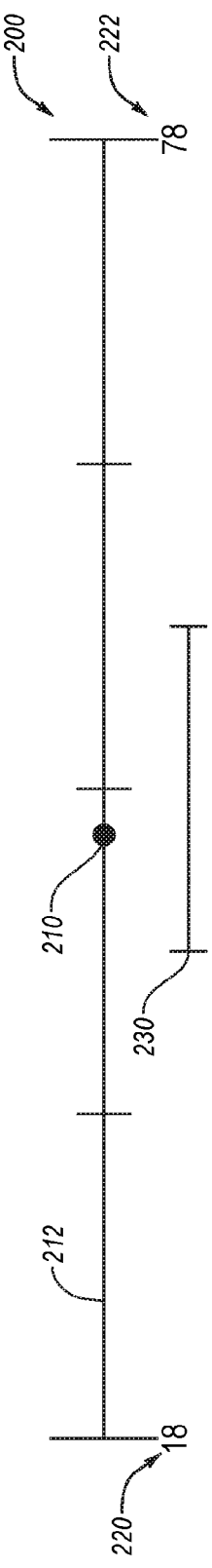

GRAPHICAL USER INTERFACE ELEMENT ADJUSTMENT

FIELD

The embodiments discussed herein are related to graphical user interface element adjustment.

BACKGROUND

A graphical user interface (GUI) is an interface to a computer software application that takes advantage of graphical capabilities of computer systems. A GUI may include various elements that display information to and/or receive input from a user. GUI elements may sometimes be referred to as widgets and may include custom user interface components or standard components such as, for example, scroll bars, push buttons, check boxes, radio buttons, and text panes. Many computer software applications, websites, and other programs provide GUIs to allow for user interaction.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which:

FIGS. 2a-2e illustrates various example configurations of a graphical user interface element;

DESCRIPTION OF EMBODIMENTS

Some embodiments in this disclosure relate to adjustment of a graphical user interface (GUI) element. A GUI element may include elements that all a user to interact with a graphical user interface. The user interaction with a GUI element may include inputting information, adjusting the display of information on the GUI, or other interactions. Some embodiments in this disclosure describe a GUI dynamically changing based on a user interaction with the GUI. For example, some embodiments, describe a GUI element that includes an adjustable elements and endpoint values. In these and other embodiments, the endpoint values may dynamically change based on the user movement of the adjustable element.

For example, in some embodiments, the GUI element may be a slider bar with an adjustable indictor that may be moved by a user to select a value. The slider bar may include endpoint values that may dynamically change based on the movement of the adjustable indictor. In some embodiments, the endpoint values may change based on an initial value selected by the adjustable indictor as compared to the endpoint value and the speed at which the user moves the adjustable indicator. By dynamically adjusting the endpoint values, the range of values that may be selected using the GUI element may be reduced. By reducing the range of selectable value, it may make user selection of a particular value within that range easier.

Figure 1:
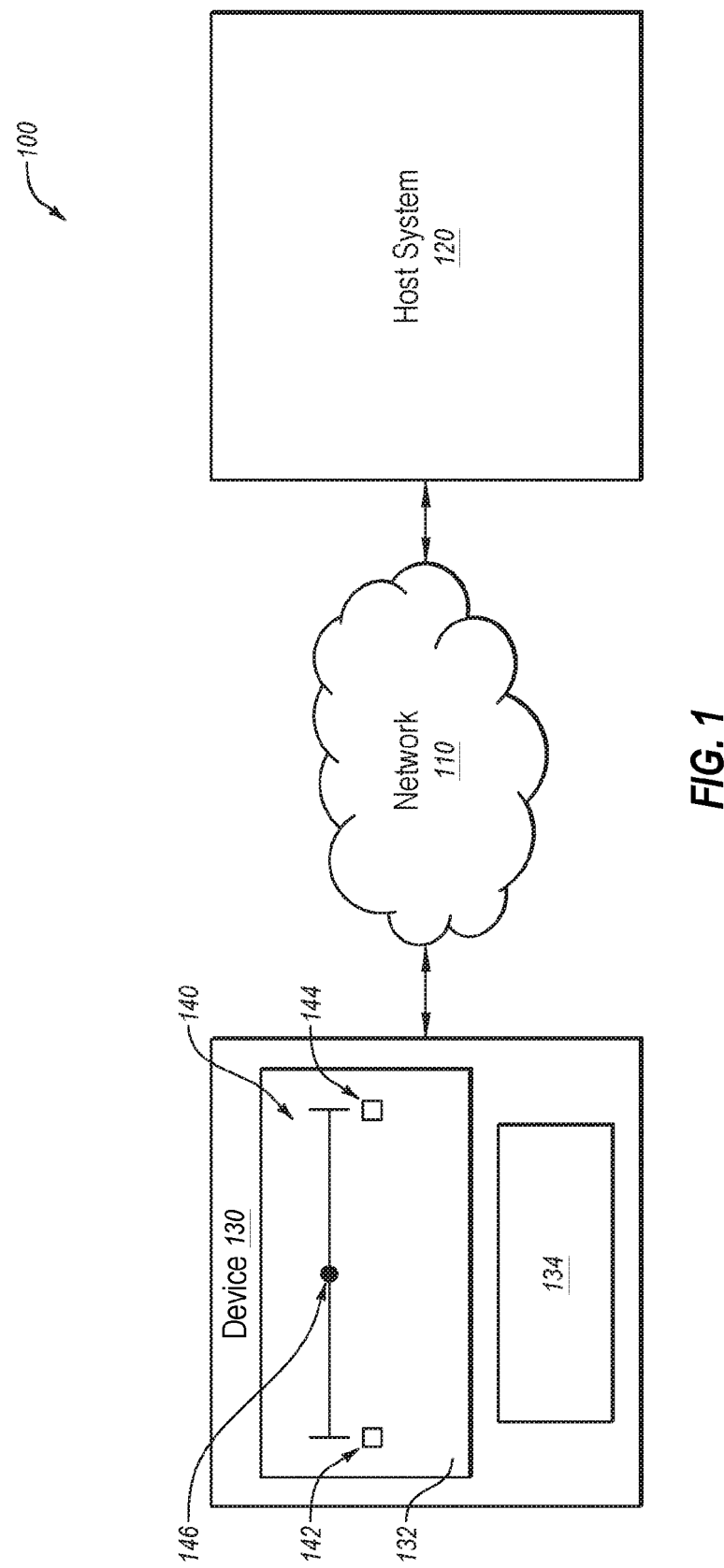
FIG. 1 illustrates an example system configured to adjust graphical user interface elements.

Turning to the figures, FIG. 1 illustrates an example system 100 configured to adjust graphical user interface elements. The system 100 may be arranged in accordance with at least one embodiment described in the present disclosure. The system 100 may include a network 110, a host system 120, and a device 130 that includes a display 132 and user interface device 134.

The network 110 may be configured to communicatively couple the host system 120 and the device 130. In some embodiments, the network 110 may be any network or configuration of networks configured to send and receive communications between devices. In some embodiments, the network 110 may include a conventional type network, a wired or wireless network, and may have numerous different configurations. Furthermore, the network 110 may include a local area network (LAN), a wide area network (WAN) (e.g., the Internet), or other interconnected data paths across which multiple devices and/or entities may communicate. In some embodiments, the network 110 may include a peer-to-peer network. The network 110 may also be coupled to or may include portions of a telecommunications network for sending data in a variety of different communication protocols. In some embodiments, the network 110 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, etc. The network 110 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 110 may include one or more IEEE 802.11 wireless networks.

In some embodiments, the host system 120 may include any configuration of hardware, such as processors, servers, and databases that are networked together and configured to perform a task. For example, the host system 120 may include multiple computing systems, such as multiple servers that each include memory and a processor, which are networked together and configured to perform operations as described in this disclosure. In some embodiments, the host system 120 may include computer-readable-instructions that are configured to be executed by the host system 120 and/or one or more devices in the system 100, such as the device 130, to perform operations described in this disclosure.

The device 130 may be any electronic or digital device. For example, the device 130 may include a desktop computer, a laptop computer, a smartphone, a mobile phone, a tablet computer, or any other processing device. In some embodiments, the device 130 may be configured to provide a user with access to one or more systems, which may include one or more servers and databases, through a network, such as the network 110.

In some embodiments, the host system 120 may include a web server that hosts webpages of a web site that are accessed through uniform resource locators (URLs). In these and other embodiments, the host system 120 may include code, such as hypertext markup language (HTML) and JavaScript code that may be provided to devices based on received requests. The device 130 may send a request with a URL of a webpage. The host system 120 may respond to the request by sending code for presenting the webpage on the device 130. The device 130 may receive the code. Based on the code, the device 130, through an application such as a web browser, may present the webpage to the user through the display 132. In some embodiments, the code provided by the host system 120 may include client-side code that may be executed by the device 130. For example, the client-side code may be JavaScript and/or HTML. The device 130 may execute the client-side code to render the webpage in the browser and to allow user interaction with the webpage in the browser.

In some embodiments, the webpage presented on the display 132 may include a GUI element 140. The GUI element 140 may be configured to be user interactive. For example, the GUI element 140 may be configured to allow a user to interact with the GUI element 140 to select a value. In some embodiments, a user may interact with the GUI element 140 using the user interface device 134. In these and other embodiments, the user interface device 134 may be a touch screen, a mouse, a keyword, a scroll pad, or some other user interface device that allows a user to interact an electronic device.

In some embodiments, the GUI element 140 may include an adjustable element 146. The adjustable element 146 may be user selectable element that based on its position along the GUI element 140 may select a value. In these and other embodiments, a user may select the adjustable element 146 using the user interface device 134. A user may then move, e.g., drag or other change the position of, the adjustable element 146 to adjust the value selected by the adjustable element 146. In some embodiments, the GUI element 140 may include a first end value 142 and a second end value 144. The first end value 142 and the second end value 144 may represent the end values for a range of values that may be selected by the adjustable element 146. For example, the first end value 142 may be zero and the second end value 144 may be one-hundred. As a result, the range of values that may be selected by the adjustable element 146 may be from zero to one-hundred.

As illustrated in FIG. 1, the GUI element 140 may be a horizontal scroll bar. Alternately or additionally, the GUI element 140 may be a vertical scroll bar. Alternately or additionally, the GUI element 140 may be a horizontal or vertical element that provides for user selection of a value by an adjustable element through movement of the adjustable element.

In some embodiments, the GUI element 140 may be configured to dynamically change the first end value 142, the second end value 144, or both the first end value 142 and the second end value 144. In some embodiments, the GUI element 140 may be configured to dynamically change one or more of the first end value 142 and the second end value 144 based on a user movement of the adjustable element 146. In these and other embodiments, based on the user movement, the starting location, and/or the final location of the adjustable element 146, an inference of a value within a sub-range of the range of selectable values that a user may desire to select may be determined. In these and other embodiments, either the first end value 142, the second end value 144, or both the first end value 142 and the second end value 144 may be changed to reflect the sub-range.

For example, the adjustable element 146 may be at zero and the GUI element 140 may have a range between zero and fifty such that the first end value 142 is zero and the second end value 144 is fifty. A user may move the adjustable element 146 quickly to forty-three. It may thus be inferred that the user may desire to select a value near fifty or at least between thirty and fifty based on the speed of the movement of the adjustable element 146 and the selected value. The values between thirty and fifty may be the sub-range of the selectable values that a user may desire to select. As a result, the first end value 142 may be changed to thirty and the second end value 144 may be maintained at fifty. A user may then further adjust the adjustable element 146 to select a value within the sub-range of value provided by the GUI element 140.

As another example, the adjustable element 146 may be at fifty and the GUI element 140 may have a range between zero and fifty such that the first end value 142 is zero and the second end value 144 is fifty. A user may move the adjustable element 146 slowly to forty-three. It may thus be inferred that the user may desire to select a value between forty and fifty based on the speed of the movement of the adjustable element 146 and the selected value. The values between forty and fifty may be the sub-range of the selectable values that a user may desire to select. As a result, the first end value 142 may be changed to forty and the second end value 144 may be maintained.

In some embodiments, the sub-range of values selected may vary based on the speed of the movement. For example, if a user moves slowly to a particular value, the sub-range around that value may be smaller than when a user moves quickly to a particular value. The sub-range may be smaller with slower movement based on the inference that a user moving slowly may be more accurately trying to select a value next to the particular value.

For example, the adjustable element 146 may be at zero and the GUI element 140 may have a range between zero and fifty such that the first end value 142 is zero and the second end value 144 is fifty. A user may move the adjustable element 146 quickly to twenty-five. It may thus be inferred that the user may desire to select a value between fifteen and thirty-five based on the speed of the movement of the adjustable element 146 and the selected value. The values between fifteen and thirty-five may be the sub-range of the selectable values that a user may desire to select. As a result, the first end value 142 may be changed to fifteen and the second end value 144 may be change to thirty-five. Alternately, the user may slowly move the adjustable element 146 to twenty-five. It may thus be inferred that the user may desire to select a value between twenty-five and thirty-five based on the speed of the movement of the adjustable element 146 and the selected value. The values between twenty-five and thirty-five may be the sub-range of the selectable values that a user may desire to select. As a result, the first end value 142 may be changed to twenty-five and the second end value 144 may be change to thirty-five.

In some embodiments, when either of the first end value 142 or the second end value 144 change, an amount that the adjustable element 146 may be moved before the adjustable element 146 selects another value may change. For example, the first end value 142 and the second end value 144 may define a range of 50 units. A movement of length x by the adjustable element 146 may result in the adjustable element 146 moving 10 units. After changing one or more of the first end value 142 and the second end value 144 to decrease the range to 25 units, a movement of length x by the adjustable element 146 may result in the adjustable element 146 moving 5 units. Thus, an amount of movement of the adjustable element 146 to increment between values may change with a change of one or more of the first end value 142 and the second end value 144. By changing the amount of movement of the adjustable element 146 to increment between values may allow a user to more easily select a particular value.

In some embodiments, the speed of the movement of the adjustable element 146 may be determined based on the distance moved by the adjustable element 146 and the time of the movement of the adjustable element 146. The time of the movement of the adjustable element 146 may be defined as the time between when a user selects the adjustable element 146 and unselects the adjustable element 146. Alternately or additionally, the time may be defined as the time between movements of the adjustable element 146. For example, a user may select the adjustable element 146 and not move the adjustable element 146 for a period before moving the adjustable element 146 and then unselecting the adjustable element 146. In these and other embodiments, the time during with the adjustable element 146 was selected but not moving may not be used to determine the speed of the adjustable element 146.

In some embodiments, the distance moved by the adjustable element 146 may be based on the values in the GUI element 140. For example, if the adjustable element 146 moved from a first selectable value to a second selectable value along the GUI element 140, the distance moved may be based on a difference between the first selectable value and the second selectable value. Alternately or additionally, the distance moved may be based on an actual distance moved by the adjustable element 146 along the display 132, a number of pixels passed over by the adjustable element 146 along the display 132, an actual distance moved by the user as detected by the user interface device 134. The units of the measurement of the distance may vary as along as thresholds and other calculations used by the GUI element 140 to change the values of the first end value 142 and the second end value 144 are consistent with the units of the measurement of the distance.

In some embodiments, the starting location of the adjustable element 146 when the values of the first end value 142 and the second end value 144 may dynamically change may be consistent. For example, the GUI element 140 may dynamically change the values of the first end value 142 and the second end value 144 after a first user interaction with the adjustable element 146 but not during a second user interaction with the adjustable element 146, until either the GUI element 140 is reset. The GUI element 140 may be reset using a button on the GUI element 140, by refreshing a webpage or application that includes the GUI element 140, or in some other manner. In these and other embodiments, the adjustable element 146 may start at the first end value 142 or the second end value 144. In these and other embodiments, the final location of the adjustable element 146 may not be determined or used in determining the sub-range. Rather a calculation to determine the sub-range may be based on the distance moved by the adjustable element 146 as the final location may be determined based on the distance.

In some embodiments, the user may move the adjustable element 146 in a manner that causes the GUI element 140 to update the first end value 142 and/or the second end value 144 such that a desired value by the user is no longer in the range between the first end value 142 and the second end value 144. In these and other embodiments, the GUI element 140 may include a reset button. The reset button may allow the user to undue the dynamic change to the first end value 142 and/or the second end value 144.

An example of the operation follows. A user may cause the device 130 to request a webpage from the host system 120 over the network 110. The host system 120 may provide code to the device 130. A web browser in the device 130 may execute the code to present the webpage on the display 132. The webpage may include the GUI element 140 to allow a user to select a value. For example, the webpage may be part of a website for an online marketplace and the value to select may refer to a price for selling and/or buying a product on the online marketplace. The user may use the user interface device 134 to select the adjustable element 146. The user may cause the adjustable element 146 to move quickly half way between the first end value 142 and the second end value 144. As a result, the GUI element 140 may dynamically change the first end value 142 and the second end value 144 and update the first end value 142 and the second end value 144 presented in the display 132. The user may further move the adjustable element 146 again to make a final value selection with the adjustable element 146.

Modifications, additions, or omissions may be made to the system 100 without departing from the scope of the present disclosure. For example, in some embodiments, the system 100 may not include the host system 120 or the network 110. In these and other embodiments, the device 130 may include an application that includes code that presents the GUI element 140 on the display 132 and performs the other actions provided in this disclosure with respect to the GUI element 140.

FIGS. 2a-2e illustrates various example configurations of a graphical user interface element 200. The graphical user interface (GUI) element 200 may be arranged in accordance with at least one embodiment described in the present disclosure.

Figure 2E:
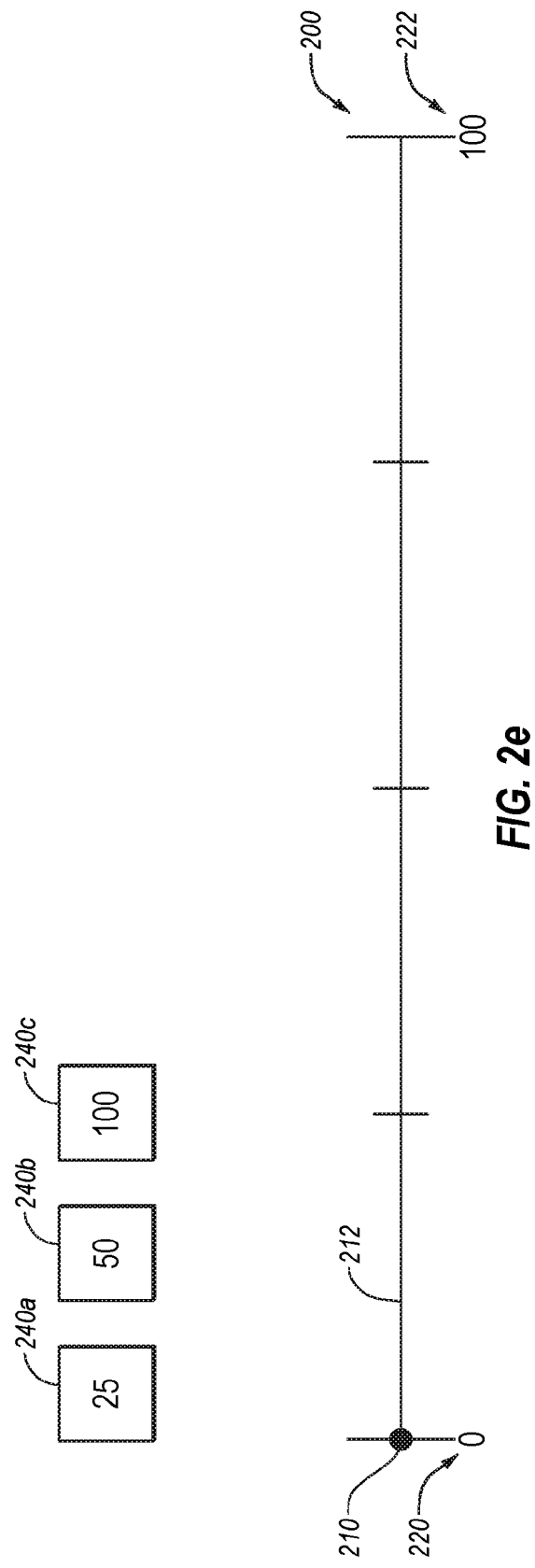

FIG. 2a illustrates the GUI element 200. As illustrated in FIGS. 2a-2e, the GUI element 200 may be a slider bar element that allows a user to select value along the slider bar. The GUI element 200 may include a slider element 210, a slider line 212, a first end value 220, and a second end value 222. The slider line 212 may extend between the first end value 220 and the second end value 222. As illustrated in FIG. 2a, the first end value 220 may have a value of zero and the second end value 222 may have a value of one-hundred.

The slider element 210 may be configured to be moveable along the slider line 212 by a user. The position of the slider element 210 along the slider line 212 may determine a value that may be selected by the slider element 210. Thus, a user may change the position of the slider element 210 along the slider line 212 to adjust a value selected by the slider element 210.

In some embodiments, the GUI element 200 may be configured to dynamically update the either the first end value 220, the second end value 222, or the first end value 220 and the second end value 222 based on movement of the slider element 210. FIGS. 2b-2d illustrate the slider element 210 in various positions along the slider line 212 and the resulting changes in either the first end value 220, the second end value 222, or the first end value 220 and the second end value 222.

FIG. 2b, illustrates the GUI element 200 with the slider element 210 moved along the slider line 212 to a value of thirty on the slider line 212. As illustrated, the first end value 220 may be updated and the second end value 222 may not be updated based on the movement of the slider element 210.

To determine which of the first end value 220 and/or the second end value 222 to adjust, the speed of the movement of the slider element 210 may be determined. The speed of the slider element 210 may be determined based on a time of the movement of the slider element 210 and the distance moved by the slider element 210.

The speed may be compared to a threshold. When the speed is above the threshold, the end value with the higher value and located opposite the starting location of the slider element 210 may be adjusted. Thus, when the speed is above the threshold, the second end value 222 may be adjusted.

When the speed is below the threshold, the end value with the lower value and located at the starting location of the slider element 210 may be adjusted. Thus, when the speed is below the threshold, the slider element 210 may be adjusted.

The threshold may be determined based on the range of values between the first end value 220 and the second end value 222. Alternately or additionally, the threshold may be determined based on actual physical dimensions of the GUI element 200 or on the actual physical dimensions of the GUI element 200 with respect to the range of values between the first end value 220 and the second end value 222. Alternately or additionally, the threshold may be based on data collected regarding user movements of the slider element 210.

In some embodiments, when the end location of the slider element 210 is near a middle of the slider line 212, both of the first end value 220 and the second end value 222 may be adjusted and determining which of the first end value 220 and the second end value 222 to adjust based on the speed may not be applicable. In these and other embodiments, the end location of the slider element 210 may be near the middle of the slider line 212 when the end location is within plus or minus 3, 5, 7, 10, 15, 20, 25, 30, or 35 percent of the range of the GUI element 200.

As illustrated in FIG. 2b, the slider element 210 may have moved 30 units and in a time of 0.3 seconds. The speed of the slider element 210 may be distance divided by the time. Thus, the speed of the slider element 210 may be 100. With respect to FIGS. 2b and 2c, the threshold may be 50. Thus, the first end value 220 may be changed. The amount that the first end value 220 may be changed may be based on the following example formula:

$$((D-L)*(1-T)*RC)-L$$

where D is distance moved from the first end value 220, L is the value of the first end value 220, T is the time of movement of the slider element 210, and RC is a constant between zero and one. The value of RC may vary based on the GUI element 200, the range of the GUI element 200, the user for which the GUI element 200 is designed for, among other factors.

Using the formula, D may be 30, L may be 0, T may be 0.3, and RC may be 0.8. Thus, the updated value for the first end value 220 may be 16.8. In some embodiments, the updated value may be rounded to the next integer. Thus, the first end value 220 may be updated and presented in the GUI element 200 with a value of 17.

FIG. 2c, illustrates the GUI element 200 with the slider element 210 moved along the slider line 212 to a value of thirty on the slider line 212. As illustrated, the first end value 220 may be not be updated and the second end value 222 may be updated based on the movement of the slider element 210.

As illustrated in FIG. 2c, the slider element 210 may have moved 30 units and in a time of 0.9 seconds. Thus, the speed of the slider element 210 may be 33.3. Because the speed 33.3 is less than the threshold 50, the second end value 222 may be changed. The amount that the second end value 222 may be changed may be based on the following example formula:

$$R-((R-D)*T*RC)$$

where D is distance moved from the first end value 220, R is the value of the second end value 222, T is the time of movement of the slider element 210, and RC is the constant between zero and one.

Using the formula, D may be 30, R may be 100, T may be 0.9, and RC may be 0.8. Thus, the updated value for the second end value 222 may be 49.6. The updated value 49.6 may be rounded and the second end value 222 may be updated and presented in the GUI element 200 with a value of 50.

FIG. 2d, illustrates the GUI element 200 with the slider element 210 moved along the slider line 212 to a value of forty-five on the slider line 212. As illustrated, the first end value 220 may be updated and the second end value 222 may be updated based on the movement of the slider element 210.

As illustrated in FIG. 2d, the slider element 210 may have moved 45 units and in a time of 0.5 seconds. Thus, the speed of the slider element 210 may be 90. A middle region 230 of the GUI element 200 may be defined. However, because the slider element 210 is moved within the middle region 230 of the GUI element 200, both the first end value 220 and the second end value 222 may be changed. The amount that the first end value 220 may be changed may be based on the following example formula:

$$((D-L)*(1-T)*RC)-L$$

Using the formula, D may be 45, L may be 0, T may be 0.5, and RC may be 0.8. Thus, the updated value for the slider element 210 may be 18. The amount that the second end value 222 may be changed may be based on the following example formula:

$$R-((R-D)*T*RC)$$

Using the formula, D may be 45, R may be 100, T may be 0.5, and RC may be 0.8. Thus, the updated value for the second end value 222 may be 78.

FIG. 2e, illustrates the GUI element 200 with a first preselected value element 240a, a second preselected value element 240b, and a third preselected value element 240c, referred to collectively as the preselected value elements 240. Each of the preselected value elements 240 may be a set value that may be selected by a user in place of moving the slider element 210 along the slider line 212 to select a value. In these and other embodiments, the slider element 210 may be moved to one of the preselected value elements 240. The value of the preselected value element 240 over which the slider element 210 is moved may be a value selected by the GUI element 200. The preselected value elements 240 may allow a user an alternative method to select one or more specific value using the GUI element 200 then by moving the slider element 210 along the slider line 212.

Modifications, additions, or omissions may be made to the GUI element 200 without departing from the scope of the present disclosure. For example, in some embodiments, the values of the first end value 220 and the second end value 222 may be different. For example, the first end value 220 may have a higher value than the second end value 222. Alternately or additionally, the formulas used to determine the changing of the first end value 220 and/or the second end value 222 may be different. Alternately or additionally, the GUI element 200 may include additional preselected value elements than the preselected value elements 240 illustrated in FIG. 2e.

Figure 3A:
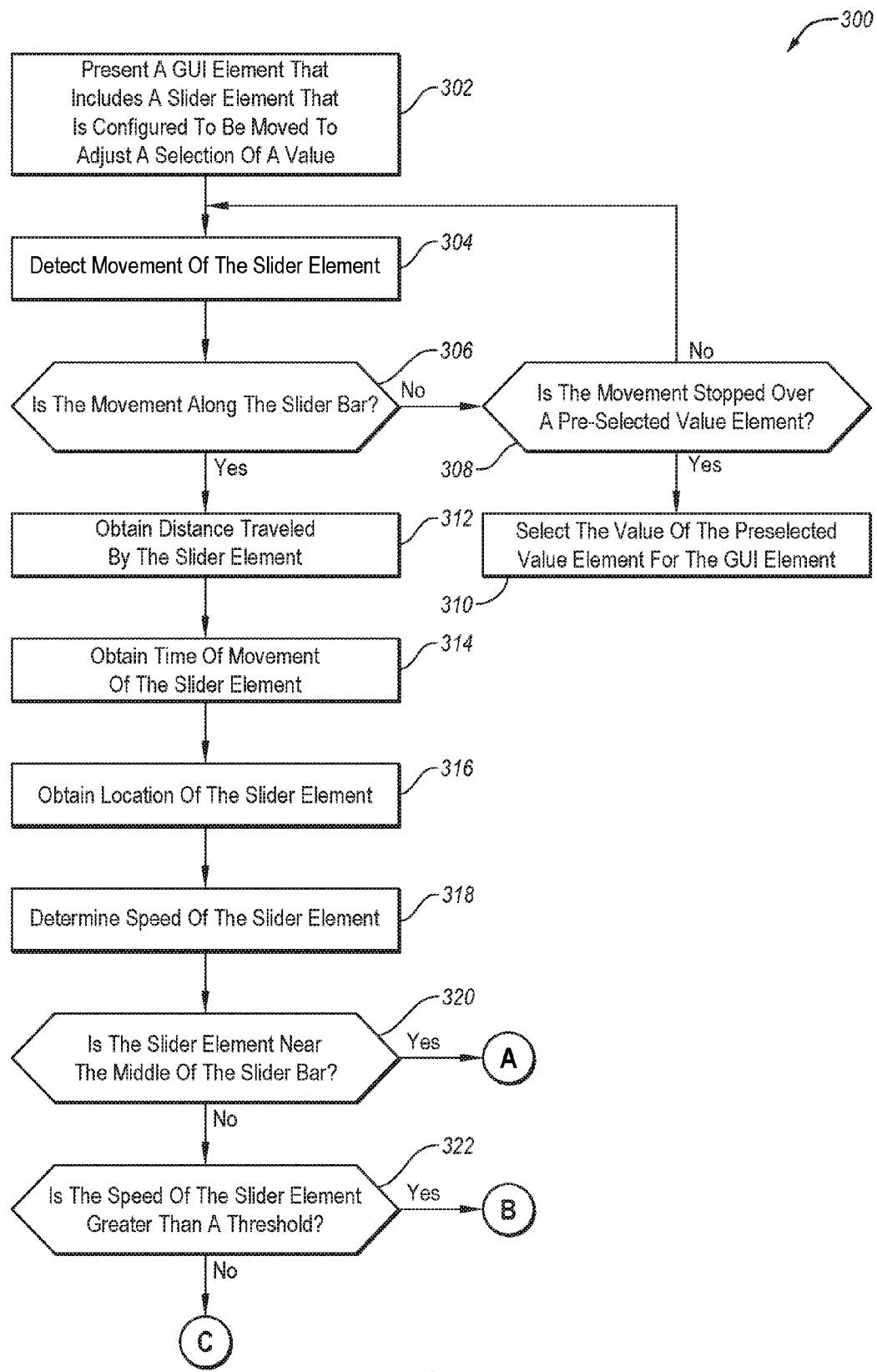
FIGS. 3a and 3b are a flowchart of an example computer-implemented method of graphical user interface element adjustment.
Figure 3B:
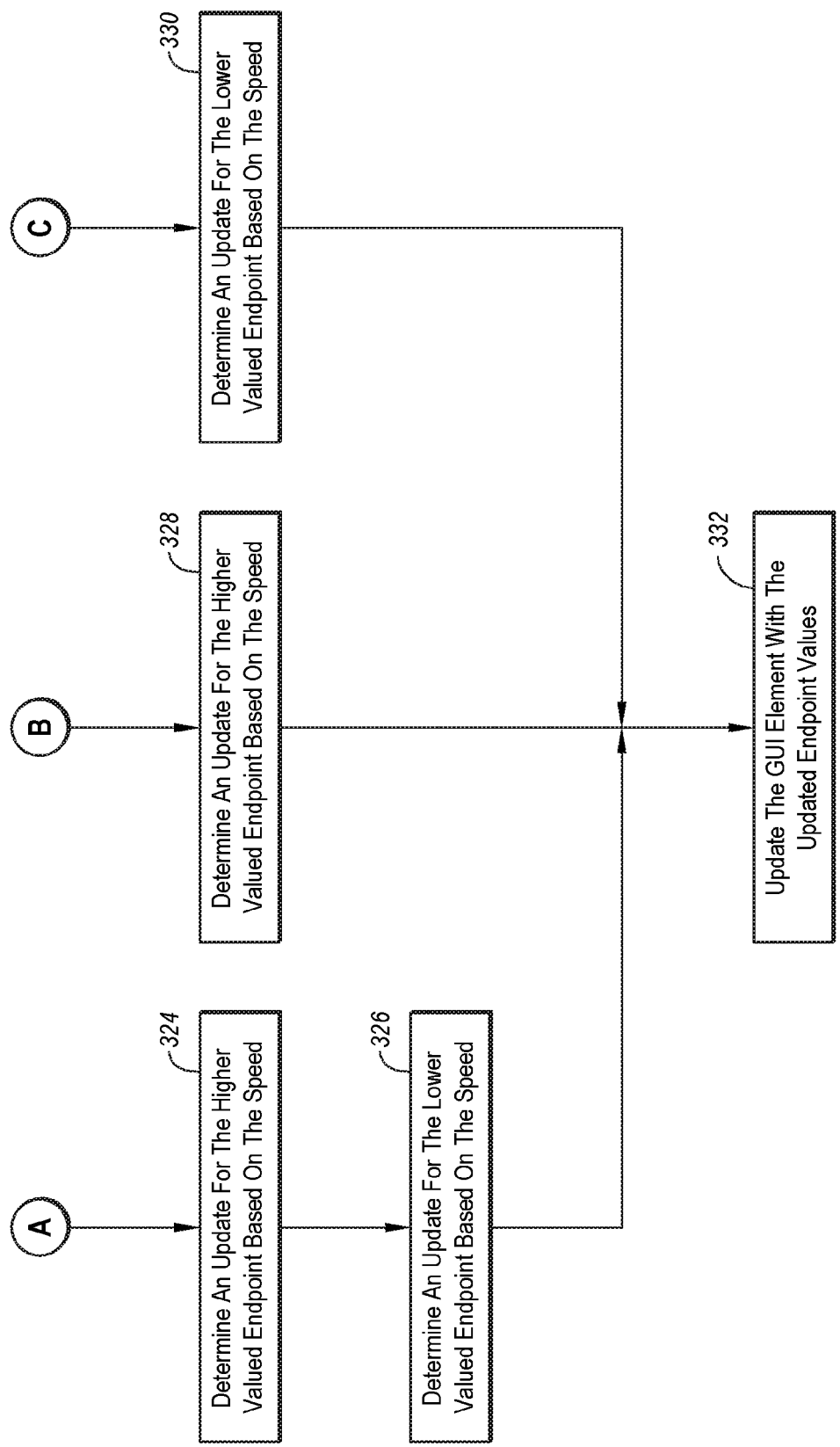

FIGS. 3a and 3b are a flowchart of an example computer-implemented method 300 of graphical user interface element adjustment. The method 300 may be arranged in accordance with at least one embodiment described in the present disclosure. The method 300 may be implemented, in some embodiments, by a system, such as the system 100 and/or 500 of FIGS. 1 and 5, respectively. In some embodiments, the method 300 may result from operations performed by a system based on instructions stored in one or more computer-readable media. Although illustrated as discrete blocks, various blocks may be divided into additional blocks, combined into fewer blocks, or eliminated, depending on the desired implementation.

The method 300 may begin at block 302, where a GUI element that includes an adjustable element that is configured to be moved to adjust a selection of a value between a first end value and a second end value presented in the GUI element. In some embodiments, the GUI element may be a slider bar and the adjustable elements may be a slider element. In some embodiments, the GUI element may be part of a webpage presented in a browser on the device. In these and other embodiments, the method 300 may be performed by a device displaying the webpage based on instructions received with respect to the webpage from a web server.

In block 304, movement of the slider element may be detected. In some embodiments, the movement of the slider element may be caused by a user interaction with the GUI element through a user interface of the device displaying the GUI element.

In block 306, it may be determined if the movement of the slider element is along the slider bar of the GUI element. When the movement is along the slider bar, the method 300 may proceed to block 312. When the movement is not along the slider bar, the method may proceed to block 308.

In block 308, it may be determined if the movement stopped over a preselected value element that is part of the GUI element. When the movement does not stop over a preselected value element, the method 300 may proceed to block 304. When the movement stops over a preselected value element, the method may proceed to block 310.

In block 310, the value of the preselected value element may be selected as the selected value for the GUI element.

In block 312, after the movement of the slider element along the slider bar stops, the distance traveled by the slider element may be obtained. The distance may be a number of units traveled by the slider element along the slider bar. In some embodiments, the distance may be obtained after a user deselects the slider element.

In block 314, the time of the movement of the slider element may be obtained. In some embodiments, the time of the movement of the slider element may be a time between a selection and deselection of the slider element by a user. In some embodiments, the time of the movement of the slider element may be a time between a detection of movement and detection of no movement of the slider element. Alternately or additionally, the time of the movement of the slider element may combination of detection of movement and non-movement and selection and non-selection of the slider element.

In block 316, the location of the slider element along the slider bar may be obtained. In some embodiments, the location of the slider element along the slider bar may be based on the value selected by the slider element. In some embodiments, the location of the slider element may be obtained by determining the location based on the distance traveled by the slider element and the starting location of the slider element. For example, the slider element may start at a known location. In some embodiments, the distance traveled may be obtained based on the location of the slider element and the starting location of the slider element.

In block 318, the speed of the slider element may be determined based on the distance traveled of the slider element and the time of the movement of the slider element.

In block 320, it may be determined if the slider element is near the middle of the slider bar. When the slider element is near the middle of the slider bar, the method 300 may proceed to block 324. When the slider element is not near the middle of the slider bar, the method may proceed to block 322.

In block 322, it may be determined if the speed of the slider bar is greater than a threshold. The threshold may be selected based on the GUI element application, the interface device used by the user to interface with the GUI element, among other factors. When the speed of the slider bar is greater than the threshold, the method 300 may proceed to block 328. When the speed of the slider bar is not greater than the threshold, the method may proceed to block 330.

In block 324, an update for the higher valued endpoint based on the speed of the slider element may be determined. The update for the higher valued endpoint may be based on the speed and the location of the slider element. Alternately or additionally, the update for the higher valued endpoint may be based on the speed and the distance traveled by the slider element.

In block 326, an update for the lower valued endpoint based on the speed of the slider element may be determined. The update for the lower valued endpoint may be based on the speed and the location of the slider element. Alternately or additionally, the update for the lower valued endpoint may be based on the speed and the distance traveled by the slider element. After the block 326, the method may proceed to block 332

In block 328, an update for the higher valued endpoint based on the speed of the slider element may be determined. The update for the higher valued endpoint may be based on the speed and the location of the slider element. Alternately or additionally, the update for the higher valued endpoint may be based on the speed and the distance traveled by the slider element. After the block 328, the method may proceed to block 332.

In block 330, an update for the lower valued endpoint based on the speed of the slider element may be determined. The update for the lower valued endpoint may be based on the speed and the location of the slider element. Alternately or additionally, the update for the lower valued endpoint may be based on the speed and the distance traveled by the slider element. After the block 330, the method may proceed to block 332.

In block 332, the GUI element may be updated with the updated endpoint values. In some embodiments, updating the GUI element may include presenting the GUI element with the updated endpoint values. In some embodiments, updating the endpoint values of the GUI element may change a scaling of the slider bar.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 300 may not include blocks 306, 308, and 310. Alternately or additionally, the method 300 may not include blocks 312 or 316. In some embodiments, the block 312, 314, and 316 may be arranged in a different order. For example, the block 316 may be before the blocks 312 and 314. As another example, in some embodiments, the block 318 may be after the block 320.

Figure 4:
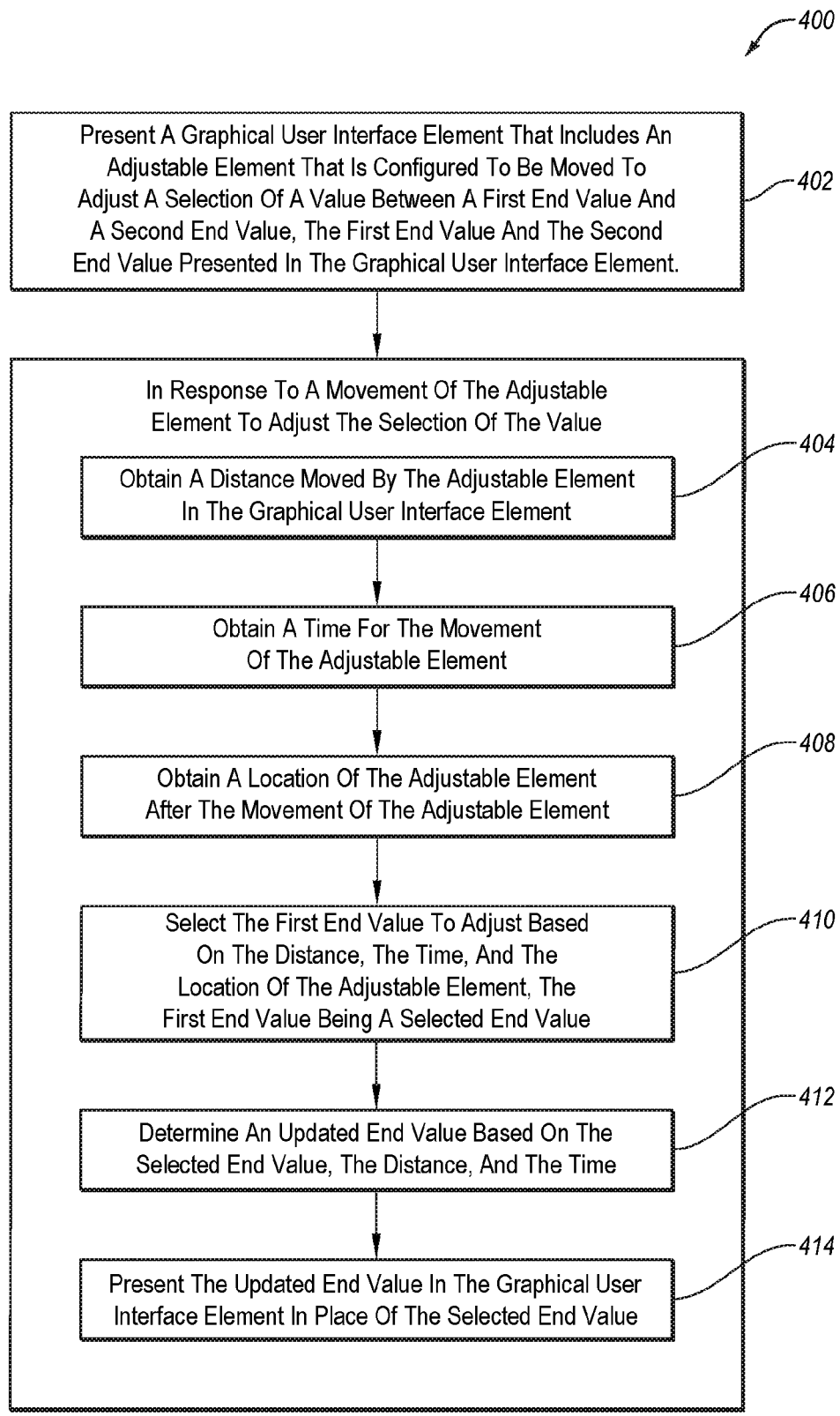
FIG. 4 is a flowchart of example operations to adjust graphical user interface elements.

FIG. 4 is a flowchart of example operations 400 to adjust graphical user interface elements. The operations 400 may be arranged in accordance with at least one embodiment described in the present disclosure. The operations 400 may be performed, in some embodiments, by a system, such as the system 100 and/or 500 of FIGS. 1 and 5, respectively. In these and other embodiments, the operations 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The operations 400 may begin at block 402, where a graphical user interface element may be presented. The graphical user interface may include an adjustable element that is configured to be moved to adjust a selection of a value between a first end value and a second end value. In some embodiments, the first end value and the second end value may be presented in the graphical user interface element. In some embodiments, the graphical user interface element may include a slider bar. In these and other embodiments, the adjustable element may be a slider element on the slider bar that slides along a line with values that range between the first end value and the second end value.

In some embodiments, in response to a movement of the adjustable element to adjust the selection of the value, the operations 400 may further block 404, 406, 408, 410, 412, and 414.

In block 404, a distance moved by the adjustable element in the graphical user interface element may be obtained. In block 406, a time for the movement of the adjustable element may be obtained.

In block 408, a location of the adjustable element after the movement of the adjustable element may be obtained. In block 410, the first end value may be selected to be adjusted based on the distance, the time, and the location of the adjustable element. The first end value may be a selected end value In block 412, an updated end value may be determined based on the selected end value, the distance, and the time. In block 414, the updated end value may be presented in the graphical user interface element in place of the selected end value.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the operations 400 may further include determining a second updated end value based on the second end value, the distance, and the time. The operations 400 may further include presenting the second updated end value in the graphical user interface element in place of the second end value.

Alternately or additionally, in response to the location of the adjustable element corresponding to a location value that is approximately in a middle third between the first end value and the second end value, the operations 400 may further include selecting the second end value to adjust.

In some embodiments, the operations 400 may further include determining a speed of the adjustable element when the adjustable element is moved based on the distance and the time. In these and other embodiments, when the speed is less than a threshold the first end value may be a lower value than the second end value and when the speed is more than the threshold the first end value may be a higher value than the second end value.

In some embodiments, after the presentation of the updated end value in the graphical user interface element in place of the selected end value, the operations 400 may further include obtaining a second movement of the adjustable element to further adjust the selection of the value. In these and other embodiments, the selection of the value is constrained between the updated end value and the second end value.

In some embodiments, the movement of the adjustable element to adjust the selection of the value may be along a line of a slider bar that is included in the graphical user interface element. In some embodiments, the graphical user interface element may further include multiple value display elements adjacent to the slider bar. In these and other embodiments, in response to movement of the adjustable element off of the line to one of the multiple value display elements, the operations 400 may further include adjust the selection of the value to be a value of the one of the multiple value display elements. In some embodiments, the value of the one of the multiple value display elements and values of others of the multiple value display elements are between the first end value and the second end value.

Figure 5:
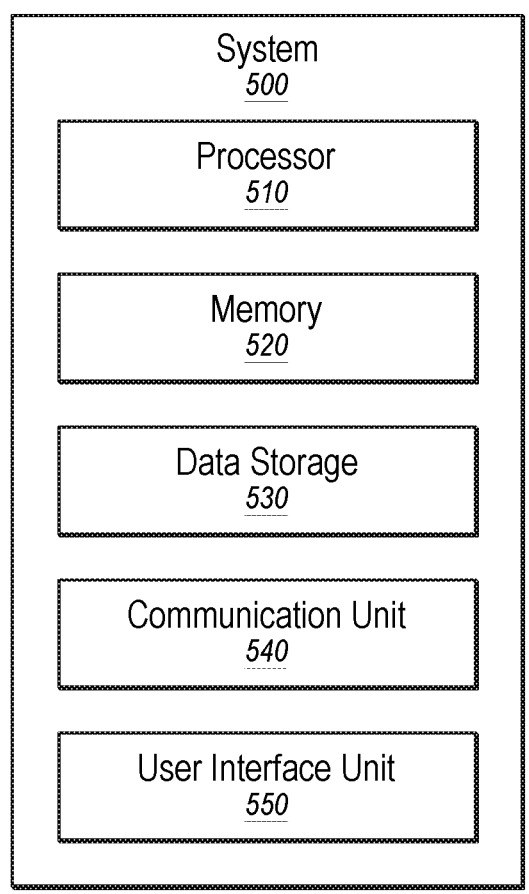
FIG. 5 illustrates another example system configured to adjust graphical user interface elements.

FIG. 5 illustrates another example system 500 configured to adjust graphical user interface elements. The system 500 may be arranged in accordance with at least one embodiment described in the present disclosure. The system 500 may include any suitable system, apparatus, or device configured to adjust a GUI element. The system 500 may include a processor 510, a memory 520, a data storage 530, a communication device 540, and a user interface unit 550, which all may be communicatively coupled.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described herein. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 510 may execute the program instructions. For example, the system 500 may be part of the device 130 of FIG. 1. In these and other embodiments, the instructions may include the processor 510 instructing the display 132 to display the GUI element 140. Alternately or additionally, the processor 510 may be determine movement of the adjustable element 146 and based on the movement determine updates for the first end value 142 and/or the second end value 144.

The memory 520 and the data storage 530 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations, such as one or more of the operations 400 or one or more blocks in the method 300.

The communication device 540 may include any component, device, system, or combination thereof that is configured to transmit or receive information over a network. In some embodiments, the communication device 540 may communicate with other devices at other locations, the same location, or even other components within the same system. For example, the communication device 540 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication device 540 may permit data to be exchanged with a network and/or any other devices or systems described in the present disclosure. For example, if the system 500 is included in the host system 120 of FIG. 1, the communication device 540 may allow the host system 120 to communicate with the device 130 over the network 110 of FIG. 1.

The user interface unit 550 may include any device to allow user to interface with the system 500. For example, the user interface unit 550 may include a mouse, a track pad, a keyboard, a touchscreen, among other devices. The user interface unit 550 may receive input from a user and provide the input to the processor 510. For example, the user interface unit 550 may be an example of the user interface device 134 of FIG. 1. Modifications, additions, or omissions may be made to the system 500 without departing from the scope of the present disclosure.

As indicated above, the embodiments described herein may include the use of a special purpose or general purpose computer (e.g., the processor 510 of FIG. 5) including various computer hardware or software modules, as discussed in greater detail below. Further, as indicated above, embodiments described herein may be implemented using computer-readable media (e.g., the memory 520 or data storage 530 of FIG. 5) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order. Generally, the terms "first," "second," "third," etc., are used to distinguish between different elements. Absence a showing of a specific that the terms "first," "second," "third," etc., connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. One or more non-transitory computer-readable media configured to store instructions that when executed by one or more processing systems performs operations, the operations comprising:
   presenting a graphical user interface element that includes a slider line extending between a first end value and a second end value in the graphical user interface element;
   presenting, on the slider line, an adjustable element that is configured to be moved along the slider line to adjust a selection of a value between the first end value and the second end value;
   detecting movement of the adjustable element along the slider line to adjust the selection of the value;
   obtaining a distance of the movement of the adjustable element, a time for the movement of the adjustable element, and a location of the adjustable element after the movement;
   determining a speed of the movement based on the distance of the movement of the adjustable element and the time for the movement of the adjustable element;
   selecting the first end value to adjust if the speed is below a threshold and selecting the second end value to adjust if the speed is above the threshold;
   determining an updated end value based on the selected end value and the speed; and
   presenting the updated end value in the graphical user interface element in place of the selected end value.

2. The one or more non-transitory computer-readable media of claim 1, wherein the operations further comprise after the presentation of the updated end value in the graphical user interface element in place of the selected end value, obtaining a second movement of the adjustable element to further adjust the selection of the value, wherein the selection of the value is constrained between the updated end value and the unselected end value.

3. The one or more non-transitory computer-readable media of claim 1, wherein the values on the slider line range between the first end value and the second end value.

4. The one or more non-transitory computer-readable media of claim 1, wherein the graphical user interface element further includes multiple value display elements adjacent to the slider line, wherein in response to movement of the adjustable element off of the slider line to one of the multiple value display elements the operations further comprise adjusting the selection of the value to be a value of the one of the multiple value display elements.

5. The one or more non-transitory computer-readable media of claim 4, wherein the value of the one of the multiple value display elements and values of others of the multiple value display elements are between the first end value and the second end value.

6. The one or more non-transitory computer-readable media of claim 1, wherein the first end value is positioned on a left side of the slider line and the second end value is positioned on a right side of the slider line.

7. The one or more non-transitory computer-readable media of claim 1, wherein the second end value is positioned on a left side of the slider line and the first end value is positioned on a right side of the slider line.

8. One or more non-transitory computer-readable media configured to store instructions that when executed by one or more processing systems performs operations, the operations comprising:
   presenting a graphical user interface element that includes a slider line extending between a first end value and a second end value in the graphical user interface element;
   presenting, on the slider line, an adjustable element that is configured to be moved along the slider line to adjust a selection of a value between the first end value and the second end value;
   in response to a movement of the adjustable element along the slider line to adjust the selection of the value:
      obtaining a location of the adjustable element after the movement of the adjustable element;
      in response to the location of the adjustable element corresponding to a location value that is approximately in a middle third between the first end value and the second end value, selecting the second end value to adjust;
      determining an updated end value for the second end value; and
      presenting the updated end value in the graphical user interface element in place of the second end value.

9. The one or more non-transitory computer-readable media of claim 8, wherein the updated end value is a first updated end value and the operations further comprise:
   determining a second updated end value; and
   presenting the second updated end value in the graphical user interface element in place of the first end value.

10. The one or more non-transitory computer-readable media of claim 8, wherein values on the slider line range between the first end value and the second end value.

11. A computer-implemented method of graphical user interface element adjustment, the method comprising:
   presenting a graphical user interface element that includes a slider line extending between a first end value and a second end value in the graphical user interface element;
   presenting, on the slider line, an adjustable element that is configured to be moved along the slider line to adjust a selection of a value between the first end value and the second end value;
   in response to a movement of the adjustable element along the slider line to adjust the selection of the value:
      determining a speed of the movement of the adjustable element;

selecting the first end value to adjust if the speed is below a threshold and selecting the second end value to adjust if the speed is above the threshold;

determining an updated end value for the selected end value; and presenting the updated end value in the graphical user interface element in place of the selected end value.

12. The computer-implemented method of claim 11, further comprising obtaining a distance moved by the adjustable element in the graphical user interface element, wherein the first end value is selected based on the time and the distance, and wherein the updated end value is determined based on the selected end value, a distance of the movement of the adjustable element, and a time of the movement of the adjustable element.

13. The computer-implemented method of claim 11, wherein the graphical user interface element includes a slider bar and the adjustable element is a slider element on the slider bar that slides along a line with values that range between the first end value and the second end value.

14. The computer-implemented method of claim 11, wherein the graphical user interface element further includes multiple value display elements adjacent to the slider line, wherein in response to movement of the adjustable element off of the slider line to one of the multiple value display elements, and further comprising adjusting the selection of the value to be a value of the one of the multiple value display elements.

15. The computer-implemented method of claim 14, wherein the value of the one of the multiple value display elements and values of others of the multiple value display elements are between the first end value and the second end value.

16. The computer-implemented method of claim 11, wherein the determining the updated end value for the selected end value is based at least in part on the speed of the movement of the adjustable element.

17. The computer-implemented method of claim 11, wherein the determining the updated end value for the selected end value is based at least in part on a location of the adjustable element after the movement.

18. The computer-implemented method of claim 11, wherein the determining the updated end value for the selected end value is based at least in part on a distance of the movement of the adjustable element or a time of the movement of the adjustable element.

19. The computer-implemented method of claim 11, wherein the first end value is positioned on a left side of the slider line and the second end value is positioned on a right side of the slider line.

20. The computer-implemented method of claim 11, wherein the second end value is positioned on a left side of the slider line and the first end value is positioned on a right side of the slider line.

* * * * *